United States Patent
Blumfield et al.

(10) Patent No.: US 8,381,298 B2
(45) Date of Patent: Feb. 19, 2013

(54) MALWARE DETENTION FOR SUSPECTED MALWARE

(75) Inventors: Anthony Blumfield, Redmond, WA (US); Robert Bisso, Redmond, WA (US); Edward Schaefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 12/165,634

(22) Filed: Jun. 30, 2008

(65) Prior Publication Data

US 2009/0328221 A1 Dec. 31, 2009

(51) Int. Cl.
*G06F 11/00* (2006.01)

(52) U.S. Cl. .......................................... 726/24; 726/22

(58) Field of Classification Search .................. 726/22, 726/24, 25; 709/223, 224; 713/187, 188, 713/190
See application file for complete search history.

(56) References Cited

U.S. PATENT DOCUMENTS

| 7,023,861 | B2 * | 4/2006 | Makinson et al. | 370/401 |
| 7,080,408 | B1 * | 7/2006 | Pak et al. | 726/24 |
| 7,237,008 | B1 * | 6/2007 | Tarbotton et al. | 709/206 |
| 7,299,361 | B1 * | 11/2007 | Kim et al. | 713/188 |
| 7,716,743 | B2 * | 5/2010 | Costea et al. | 726/25 |
| 7,865,561 | B2 * | 1/2011 | Kelly et al. | 709/206 |
| 2005/0015606 | A1 | 1/2005 | Blamires et al. | |
| 2005/0027686 | A1 | 2/2005 | Shipp | |
| 2005/0172338 | A1 | 8/2005 | Sandu et al. | |
| 2005/0216770 | A1 | 9/2005 | Rowett et al. | |
| 2006/0031673 | A1 | 2/2006 | Beck et al. | |
| 2006/0075494 | A1 * | 4/2006 | Bertman et al. | 726/22 |
| 2006/0168660 | A1 | 7/2006 | Edwards et al. | |
| 2007/0011741 | A1 | 1/2007 | Robert et al. | |
| 2007/0220607 | A1 * | 9/2007 | Sprosts et al. | 726/24 |
| 2010/0017877 | A1 * | 1/2010 | Cooley et al. | 726/22 |

OTHER PUBLICATIONS

Butler, et al., "Windows Rootkits of 2005, Part Three", http://www.securityfocus.com/infocus/1854.
Jiang. "Enabling Internet Worms and Malware Investigation and Defense using Virtualization", Date: Aug. 2006, pp. 1-154.
Radcliff, "The Evolution of IDS", Sep. 11, 2004, http://www.computerworld.com.au/index.php/id;1381312287.

* cited by examiner

*Primary Examiner* — Saleh Najjar
*Assistant Examiner* — Lashanya Nash
(74) *Attorney, Agent, or Firm* — Mayer & Williams PC

(57) ABSTRACT

A method and system for detecting and managing potential malware utilizes a preliminary signature to scan content and detect potential malware content based upon characteristics that match the preliminary signature. The detected content is detained for a predetermined period of time. If an updated signature is not received, the detained content may be purged, released or quarantined, based upon predetermined content policy. If an updated signature is received, the detained content is released from detention and rescanned with the updated signature. The content is then treated in accordance with the content policy, and again, can be purged, released, or quarantined.

13 Claims, 4 Drawing Sheets

MALWARE DETENTION FOR SUSPECTED MALWARE

BACKGROUND

As more and more computers have become interconnected through various networks such as the Internet, computer security has become increasingly more important, as abuse by malicious computer users has greatly increased, particularly from invasions or attacks delivered over a network or over an information stream. As those skilled in the art will recognize, these attacks come in many different forms, including, but certainly not limited to, computer viruses, computer worms, system component replacements, spyware, adware, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

Malware may become resident on a computer using a number of techniques. For example, a computer connected to the Internet may be attacked so that a vulnerability on the computer is exploited and the malware is delivered over the network as an information stream. By way of another example, malware may become resident on a computer using social engineering techniques. For example, a user may access a resource such as a Web site and download a program from the Web site to a local computer. While the program may be described on the Web site as providing a service desirable to the user; in actuality, the program may perform actions that are malicious.

When a malware becomes resident on a computer, the adverse results may be readably noticeable to the user, such as system devices being disabled; applications, file data, or firmware being erased or corrupted; or the computer system crashing or being unable to perform normal operations. However, some malware perform actions that are covert and not readily noticeable to the user. For example, spyware typically monitors a user's computer habits, such as Internet browsing tendencies, and transmits potentially sensitive data to another location on the network. The potentially sensitive data may be used in a number of ways, such as identifying a commercial product that matches the observed tendencies of the user. Then the spyware or an associated adware program may be used to display an advertisement to the user that promotes the identified commercial product. Since the advertisement interrupts the normal operation of the computer, the actions performed by the spyware may not be desirable to the user. Yet another pernicious aspect of many, though not all, computer malware is that an infected computer system is used to infect other computers.

A traditional defense against computer malware, and particularly computer viruses and worms, is antivirus software. Generally described, antivirus software scans data, looking for identifiable patterns associated with known computer malware. Frequently, this is done by matching patterns within the data to what is referred to as a "signature" of the malware. One of the core deficiencies in this malware detection model is that an unknown computer malware may propagate unchecked in a network until a computer's antivirus software is updated to identify and respond to the new computer malware.

When a malware infection occurs, the infection may be handled or managed in one of many different ways. Preferably, the infected computing device is capable of being "cleaned" so that the malware is no longer resident. However, in some instances, the malware may be configured to employ self-preservation techniques to resist being cleaned. In this instance, cleaning the computing device may not be feasible or may only be possible with a software update. Alternatively, files associated with the malware may be deleted from the computing device. However, as known to those skilled in the art and others, some malware attach to innocuous "hosts" which contain user data that will be lost if an infected file is deleted.

In yet another alternative, the malware may be "quarantined." Typically, a quarantine occurs when data associated with the malware is altered to prevent execution of the malware. Quarantining malware is especially useful when a file may have been incorrectly identified as malware, the user wants to delay cleaning a file until a later time, or an infected file contains user data that needs to be saved. In some existing systems, a quarantined file is both prevented from executing program code and concealed from antivirus software that scans a computing device for malware. For example, one method of implementing a quarantine includes moving a file to a quarantine folder along with associated metadata that describes the location of the file. Among other things, the quarantine folder has established settings that prevent files from "executing" program code. To conceal the quarantined file from antivirus software, the data in the file is typically encoded. As a result, the file is not capable of causing harm to a computing device and will not be identified as malware if scanned by antivirus software.

Identification of a file or content item as "malware" by antivirus software, based upon a 'signature' of the malware has various deficiencies. First, unknown computer malware may propagate undetected in a network until a computer's antivirus software is updated to identify and respond to the new computer malware. To help lessen the likelihood of this problem, a signature can be released as early as possible. However, protection technologies that are based on heuristics or signatures often suffer from false positives that run the risk of purging valid content. This problem is most noticed during the first few hours after new malware is released to the wild, while the level of information about the malware and potential side effects of its deletion is limited. To mitigate this problem protection technology vendors typically delay the release of a new signatures or heuristic patterns until the malware is fully understood and a comprehensive test pass is completed and some opt to tune the heuristics and signatures to minimize false positives with the side effect of limiting the ability to detect malware. The impact of these mitigations is an increased window of exploit from the time malware is released in the wild until an asset is protected from that malware.

SUMMARY

A malware detention arrangement enables detaining content that has a likelihood of containing malware in a secure location for up to a set period of time and releasing it from detention once that period has expired. If during this period of time an updated heuristic or signature can determine accurately whether the content contains malware or not, the content will be released from detention and treated in accordance with policy as it applies to the accurate detection determination.

This solution enables an initial application of broader detection logic having a higher likelihood of detecting malware at the expense of false positives, while limiting the impact of potential false positives by utilization of an updated signature if available.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

A system and computer-implemented method provide a means for detention of suspected malware content. Data in a detained file is incapable of causing harm to a computer even though the file retains the same attributes as the original, non-detained file. Also, a detained file may be altered so that file data will not be identified as malware by antivirus software that performs a scan of the file system. Some embodiments of the malware detention arrangement maintain a user interface, from which a user may issue a command to initiate the malware detention process, to detain or release a particular file detected as possible malware, or alternatively, the detain/release processes may be initiated automatically by the antivirus software after malware is identified.

As antivirus software has become more sophisticated and efficient at recognizing thousands of known computer malware, so too have the computer malware become more sophisticated. For example, many recent computer malware are polymorphic. These polymorphic malware are frequently difficult to identify by antivirus software because they modify themselves before propagating to another computer system. Thus under the present system, there is a period of time, referred to hereafter as a vulnerability window, that exists between when a new computer malware is released on the network and when a computer system is updated to protect it from the computer malware (as released and as modified after the initial release). As the name suggests, it is during this vulnerability window that a computer system is vulnerable or exposed to the new computer malware.

Figure 1:
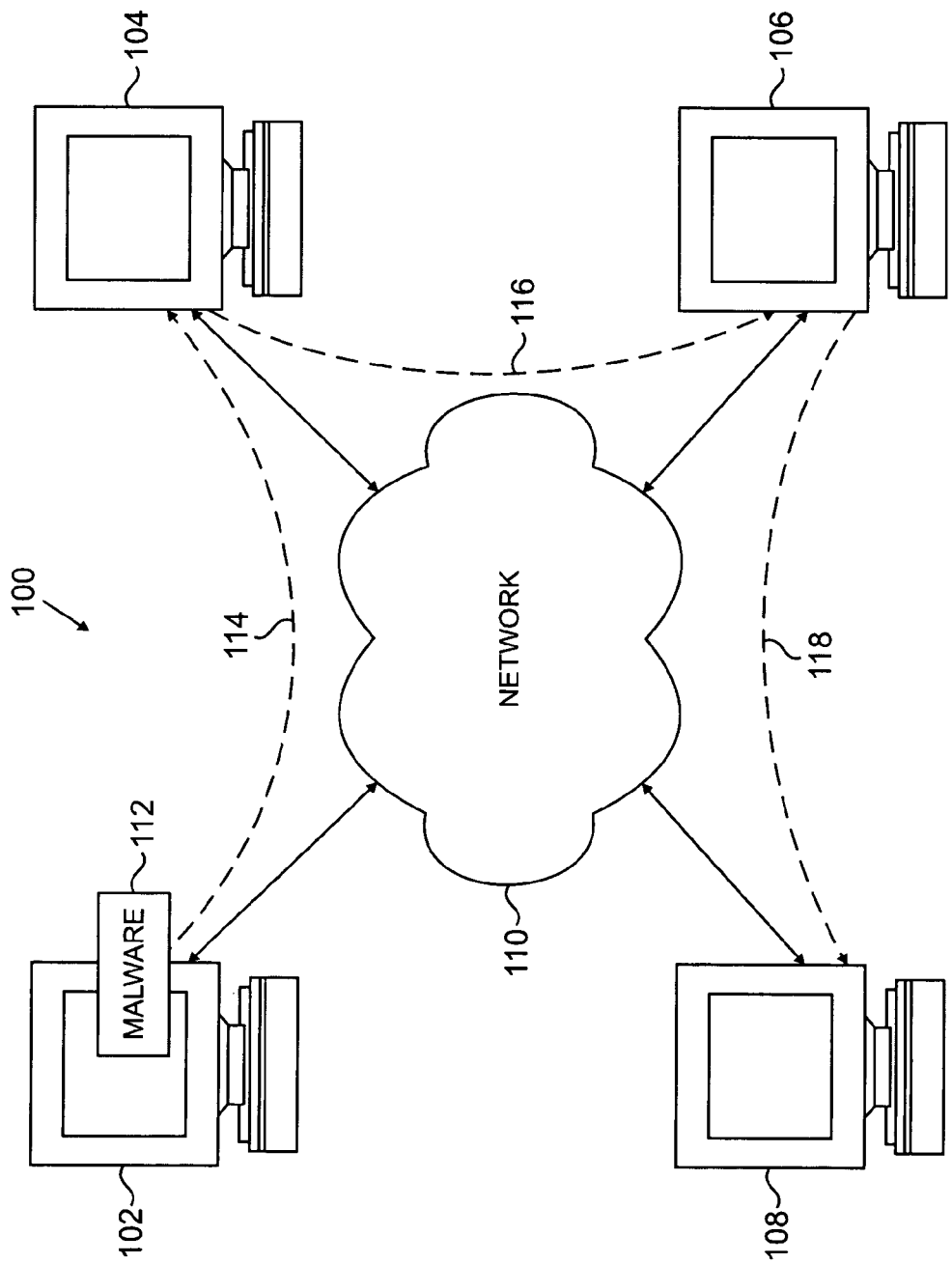
FIG. 1 is a pictorial diagram illustrating an exemplary network environment over which a computer malware is commonly distributed.

FIG. 1 is a pictorial diagram illustrating an exemplary networked environment 100 over which a computer malware is commonly distributed. As shown in FIG. 1, the typical exemplary networked environment 100 includes a plurality of computers 102, 104, 106, and 108, all interconnected via a communication network 110, such as an intranet, or via a larger communication network, including the global TCP/IP network commonly referred to as the Internet. For whatever reason, a malicious party on a computer connected to the network 110, such as computer 102, develops a computer malware 112 and releases it on the network. The released computer malware 112 is received by and infects one or more computers, such as computer 104, as indicated by arrow 114. As is typical with many computer malware, once infected, computer 104 is used to infect other computers, such as computer 106, as indicated by arrow 116, which, in turn, infects yet other computers, such as computer 108, as indicated by arrow 118. Clearly, due to the speed and reach of the modern computer networks, a computer malware 112 can grow at an exponential rate and quickly become a local epidemic that quickly escalates into a global computer pandemic.

Figure 2:
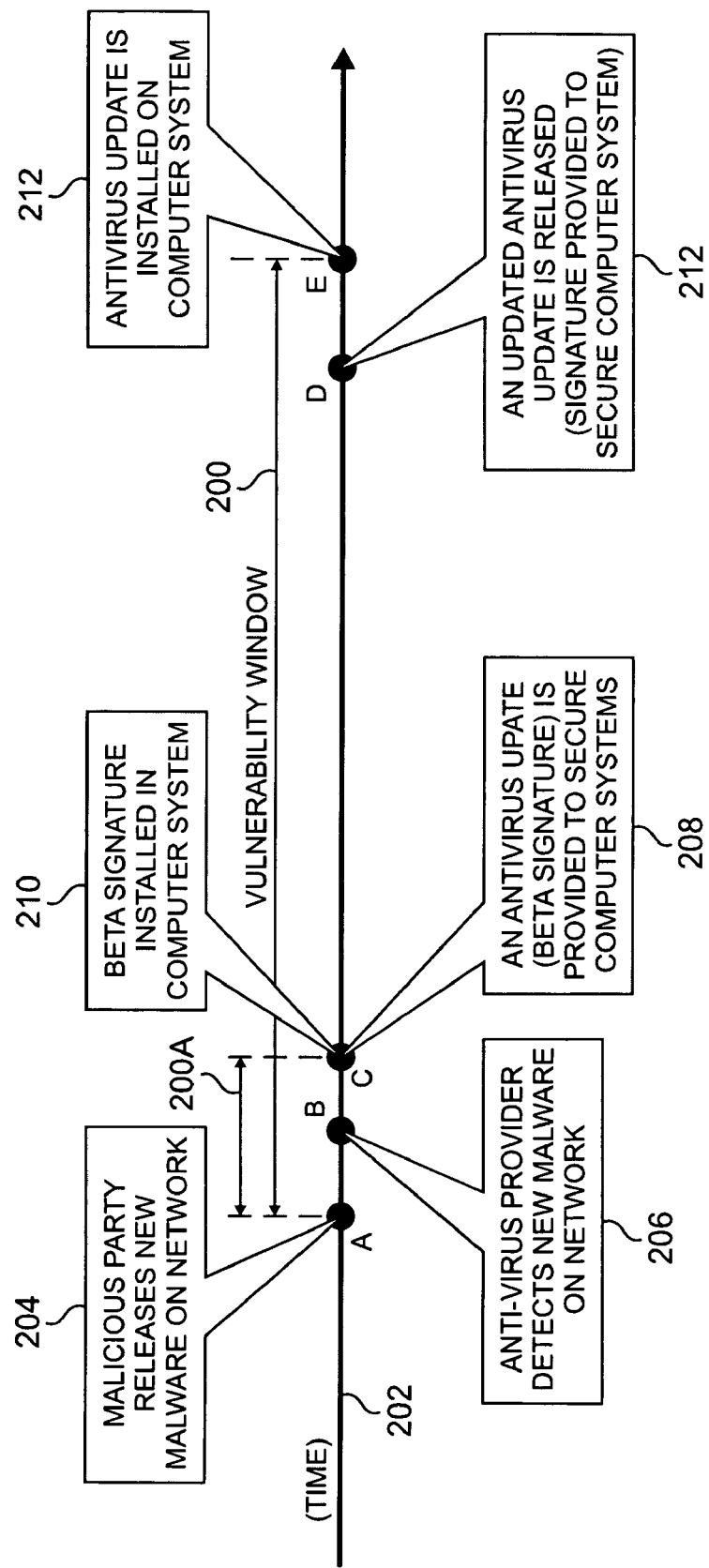
FIG. 2 is a block diagram illustrating an exemplary timeline demonstrating a vulnerability window with regard to computer malware released on a network.

FIG. 2 is a block diagram of an exemplary timeline illustrating this vulnerability window, and in particular, how the proposed malware detention system reduces the vulnerability window. In regard to the following discussion, significant times will be identified and referred to as events. FIG. 2 illustrates vulnerability window 200, and also vulnerability window 200A, with regard to a timeline 202, under which a malware is released and exploits a previously unknown vulnerability. Thus, as shown on timeline 202, at event 204 ("A"), a malicious party releases a new computer malware. As this is a computer malware that exploits a previously unknown vulnerability, antivirus software may not be able to immediately protect vulnerable computer systems from the attack. Correspondingly, the vulnerability window 200 is opened.

At some point after the new computer malware is circulating on the network 110, an antivirus software provider or similar entity detects new malware, as indicated by event 206 ("B"). As those skilled in the art will appreciate, typically the presence of the new computer malware is detected within a matter of hours by antivirus software providers. Once the computer malware is detected, the antivirus software provider may begin the process of identifying a pattern or signature by which the antivirus software may recognize the computer malware. As a result of these efforts, at event 208, the antivirus software provider releases an early antivirus update, a preliminary signature such as a "beta signature", which preliminarily addresses the computer malware. At the same time, at event 210, the beta signature is installed on a user's computer system ("C"). At a later time (perhaps a few hours, but of course it could be more or less time, depending upon the malware detected), at event 212, 'updated' antivirus data is released, i.e., an updated signature, which more accurately addresses the computer malware ("D"). Subsequently, at event 214, the update is installed on a user's computer system ("E").

As can be seen in FIG. 2, by using the release of a preliminary signature to detain suspect malware until a later updated signature is released, the vulnerability window is reduced on timeline 202A from points A to E, to a much smaller window, from A to C (i.e., when the preliminary signature is installed on the system allowing for any suspect malware to be detained), thereby protecting the computer system during a critical period of time.

As may be seen from the example provided above, which is only one representative scenario in which computer malware poses a security threat to a computer system, a vulnerability window exists between the time that a computer malware 112 is released on a network 110 and when an antivirus update is installed on a user's computer system to detect the new malware and close the vulnerability window.

One example of an implementation of the malware detection system is signature-based Anti Virus detection for email. When a new virus is detected in the wild, and a beta signature is created for its detection, there is a period of time that could be, in some cases, a few hours or even a day until a formal signature is released. During this period of time, the Anti Virus vendor will test and confirm the robustness of the solution with the signature, and also will test and confirm that the beta signature does not accidently detect valid content as containing malware. Using malware detention for email enables the email Anti Virus engine to consume the beta signature and detain any content detected by it for up to a set period of time, for example, 6 hours. If within this period of time a newer signature becomes available, the content is released from detention and is rescanned with the new signature and treated per Anti Virus policy—e.g., purged, allowed or quarantined. If the set period of time expires and there is no newer signature that can determine accurately whether the content contains malware, the e-mail is released from detention and delivered to the recipient.

An extreme case of such a signature might have very broad detection logic that is expected to detect valid content as malware—e.g., detect any file attachment with a .vbs extension. The malware detention solution enables applying such broad detection logic in the event of major outbreaks even before the malware is fully analyzed (e.g., detaining all mail with .vbs file attachments in the case of the ILoveYou mail born worm outbreak which had an executable payload in the form of a VBS file).

To protect the system from malformed signatures that may impact the robustness of the detection engine, the engine is isolated and monitored and, in the event of malfunctions, is rolled back. Those skilled in the art will appreciate that engine isolation is typically achieved by process isolation by means of operating system process space, user domain or hypervisor isolation.

One exemplary scenario of an implementation of the malware detention arrangement will now be described. First, when a new malware outbreak is discovered, a broad detection object is created and distributed that causes all suspect content items to be detained. Typically a broad detection object will detect malware as well as some non-malware content that has similar attributes to the malware.

After a predetermined period of time (e.g., a few hours), a preliminary (e.g., beta) signature is created to replace the broad detection object and is distributed, again causing suspect content items to be detained. Typically, the preliminary signature will detect and detain malware and, in rare cases, misclassify valid content as malware and detain the valid content as well. At this stage, related content detained under the broad detection object described above, is released from detention and is rescanned with the new preliminary signature.

After an additional period of time (e.g., a few hours) the preliminary (beta) signature completes a vendor release cycle, including testing and error fixing, and a release signature (an 'updated' signature) is distributed as a replacement for the preliminary (beta) signature. Typically the release signature will detect only malware and will treat the content item in accordance with the malware policy previously set up on the malware detention system. At this stage, related detained content detained under the beta signature described above, is released from detention and is rescanned with the new release signature.

Figure 3:
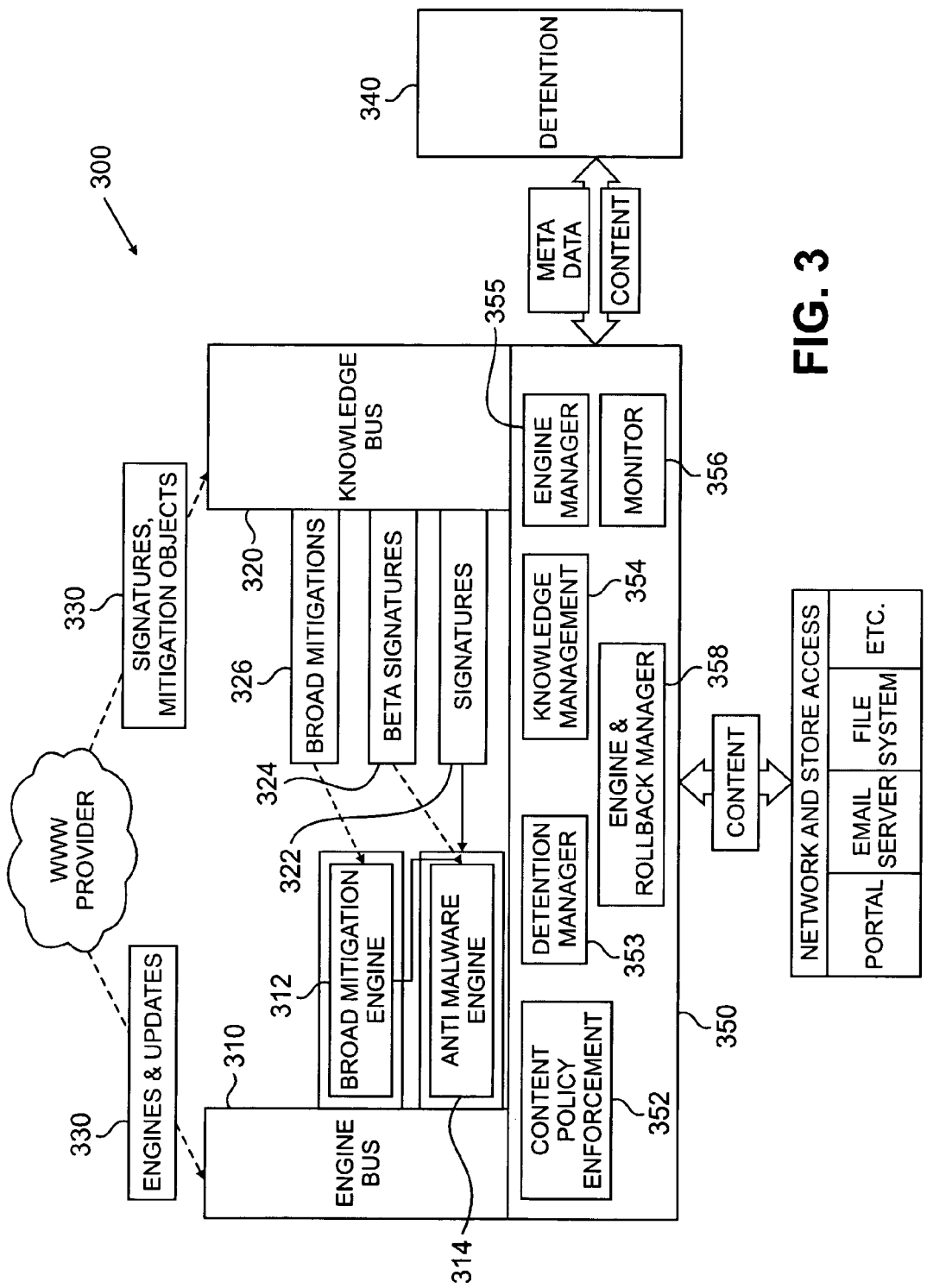
FIG. 3 is a simplified functional block diagram of an exemplary malware detention system.

Turning now to the drawings, FIG. 3 is a simplified functional block diagram of an exemplary malware detention system 300 (hereinafter referred to as "Detention System" 300) that detains suspected malware for a predetermined period of time, during which time a newly-released updated heuristic or signature can more accurately determine if the detained content contains malware.

Those skilled in the art and others will recognize that the malware detention system 300 illustrated in FIG. 3 is a simplified example which only illustrates components that are necessary for an understanding of the present invention. In actual embodiments of the present invention, the system 300 may have additional components that are not illustrated in FIG. 3. Thus, system 300 in FIG. 3 is not intended to suggest any limitation as to the scope of use or functionality of a malware detention system defined by the claims presented herein.

Now with reference to FIG. 3, components of a malware detention system 300 that is are capable of implementing aspects of the present invention will be described. FIG. 3 shows one illustrative component architecture for a malware detention system, but other architectures are possible.

As illustrated in FIG. 3, system 300 includes engine bus 310, which is a mechanism to host and isolate the detection engines (including broad mitigation engine 312 and anti-malware engine 314, but of course there could be additional engines as well)—detection engine isolators and a bus for coordination of engines and isolators are provided as well. Although illustrated as separate engines, the broad mitigation engine and the anti-malware engine could be a single engine that consumes both signatures and broad detection objects.

Knowledge bus 320 is a mechanism that hosts knowledge including signature database 322, beta signature database 324, broad mitigation detection object database 326 and a bus for coordination and knowledge. As shown, broad mitigation detection object database 322 interfaces with broad mitigation engine 112, and each of beta signature database 324 and signature database 322 interfaces with anti malware engine 314.

The service mechanism 330 is a mechanism that provides the knowledge databases and detection engines with updates to the system, including a signature feed, a beta signature feed, a broad mitigation detection object feed, an engine feed and an engine update feed.

Detention component 340 is a memory used for content that is placed in detention, including the actual content in detention and also metadata that is stored with the content in order to maintain the detention history of the content (the metadata describes attributes of the file and may include the time of the detainment, current version of the signature, the malware identified, any heightened security features that are used to limit access to the file).

Manager 350 coordinates all activities within malware detention system 300 and includes content policy enforcement component 352, detention manager 353, knowledge manager 354, engine manager 355, monitor 356 and engine and knowledge rollback mechanism 358. Manager 350 operates based upon information that arrives from the network or from any store access, for example a portal, email server, file system, etc. More specifically, content policy enforcement component 352 enforces all malware policies that apply to content, including detention policies and action policies including purge, quarantine, allow, detain, etc. Detention manager 353 maintains the detention memory 340 and enables the following functions: (1) detention admission—the process of admitting or readmitting content to detention, (2) detention release—the process of releasing content from detention, (3) detention monitor—the process of monitoring content in detention and deciding which content should be released for rescanning when new applicable signatures or heuristics are available, or if the detention period expires. The detention manager 353 monitors items that are in detention and releases them from detention to be rescanned in the event that an updated signature or heuristic becomes available or if the detention period expires.

Detention manager 352 also maintains the overall detention period of the content in detention. For example, suspected malware content may be sent to detention for a predetermined number of hours, and then rescanned and delivered, cleaned or deleted, depending on whether malware was found in the content, and upon the policy of the system.

An alternative option to only detaining the suspected malware, would be to deliver the content tagged as potential malware to the destination, without the suspect data, and in parallel send a copy of the suspected content to detention. For example if there was an outbreak of image-based malware, emails with images can be delivered to users without the image, with a message that the mail has been sanitized, and, in parallel, the original mail can be sent to detention for a predetermined period of time, and then, as in previous example, the original mail can be rescanned and delivered, cleaned or deleted depending on whether malware was found in the content and the policy of the system.

Knowledge manager 354 manages the knowledge in the knowledge bus, including signature database 322, beta signature database 324, broad mitigation detection object database 326. Engine manager 355 manages the engines in the engine bus 310. Monitor 356 monitors the malware detection system 300 to detect any system malfunctions. Engine and knowledge rollback mechanism 358 manages the coordination of rolling back an update of knowledge or engines in the event of any malfunction (e.g. malformed signatures) detected by monitor 356.

An exemplary operational process from a service provider threat center perspective is now discussed. First, the Service Provider Threat Center (the "Threat Center") becomes aware of a new outbreak and assigns a thread ID and threat level (low, med, high, critical) to the threat. Next, the Threat Center notifies the threat team of the general characteristics of the threat and provides a sample of the malware (the general characteristics can include broad characteristics such as attachment type (EXE, VBS, etc), certain subject or content keywords, etc.—for example, the characterization of the "I Love You" virus as an email whose subject line contains the word "love" and has a VBS file attachment). Then, the Threat Center team creates and distributes a filter rule (or a "beta signature") that can address these characteristics (the distributed filter rule would also contain a Threat ID and Threat Level—the Threat ID is later used for modification of the filter rule, and the Threat Level is used by the manager component 350 on the host to enable the administrator to configure which filters should be applied to content.

After distribution of the filter rule, Threat Center samples are used to determine if any new vendor signature updates address the threat. If the threat is detected, the filter is modified to utilize the updated engine and signatures. The Manager component 350 on the host system uses the threat ID to determine which detained items should be rescanned and released if no malware is detected.

Figure 4:
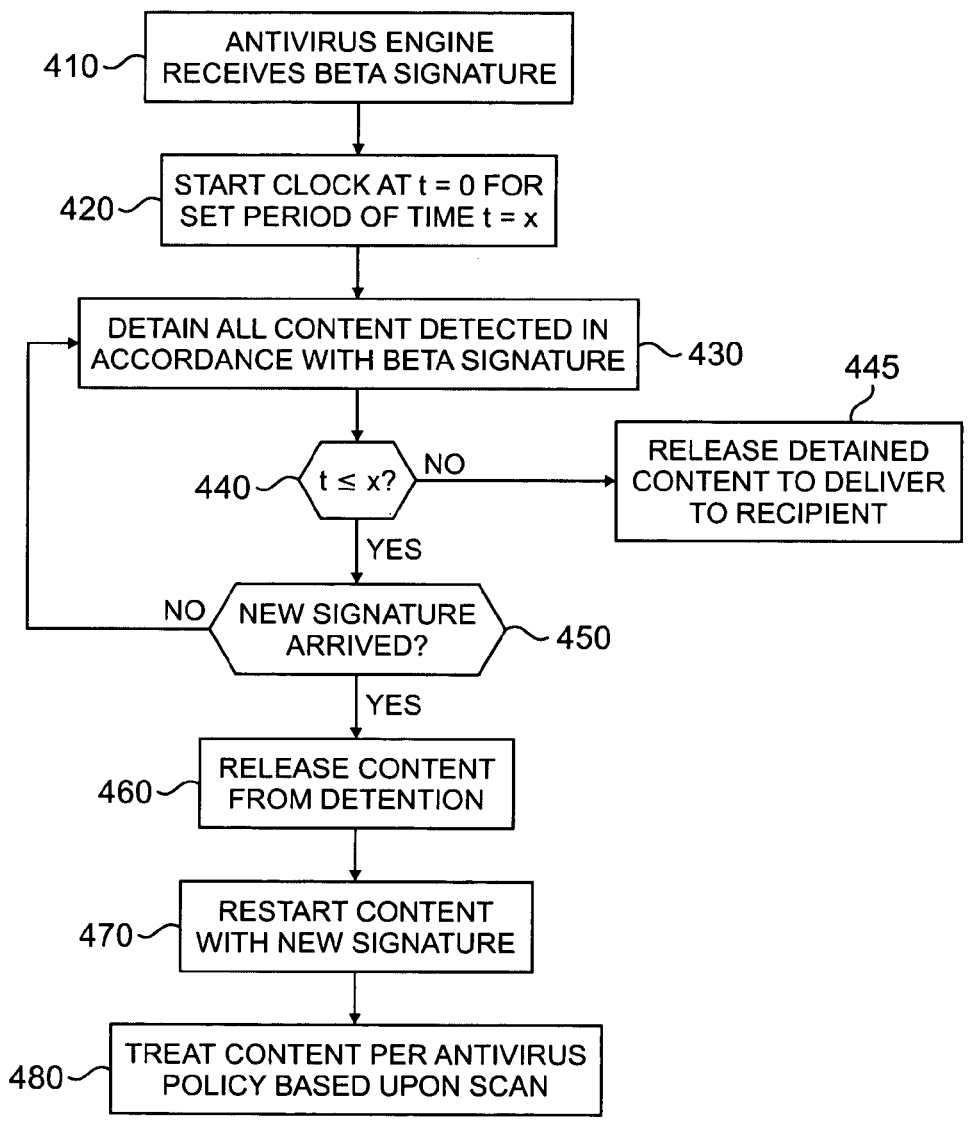
FIG. 4 is a flowchart illustrating an exemplary process performed by the malware detention system of FIG. 3.

FIG. 4 is a flow diagram illustrating one exemplary embodiment of a method of malware detention of suspected malware. As illustrated in step 410, an Anti Malware engine remains idle until it receives a preliminary (e.g., beta) signature of a new detected virus/malware. The Anti Malware engine will use the preliminary signature to detect and detain any content detected by the beta signature for a predetermined period of time "x". Accordingly, after receipt of the preliminary signature, a clock is set to time t=0 in step 420. All content detected in accordance with the preliminary signature is detained in step 430.

In step 440, a determination is made if the predetermined period of time x has elapsed. If the predetermined period of time x has elapsed in step 440, the content that was detained in step 430 is released from detention and is delivered to the recipient (alternatively, the content may be purged or quarantined, based upon predetermined policy).

If however the predetermined period of time x has not elapsed in step 440, a determination is made if a new signature has been received in step 450. If a new signature has not been received, the process returns to step 430 to continue to detain any content detected in accordance with the beta signature. If however a new signature has been received in step 450, the content that was detained is released from detention (step 460), is rescanned in accordance with the new signature (step 470), and is treated in accordance with the Anti-Virus policy (e.g., the content is purged, allowed or quarantined) based upon the outcome of the scan (step 480).

In its various forms, a malware detention system as proposed can be implemented within a "standalone" computing architecture, or within a network architecture. The standalone computing architecture allows a user to assess malware threats to an individual computing system, while the network architecture conveniently permits remote management of threats associated with participating client computing systems.

Software embodying a malware detention arrangement may be distributed in known manners, such as on computer-readable medium which contains the executable instructions, such as program modules, for performing the methodologies discussed herein. Generally described, program modules include routines, programs, objects, components, data structures, and so forth that perform particular tasks or implement particular abstract data types. Alternatively, the software may be distributed over an appropriate communications interface so that it can be installed on the user's computer system. Furthermore, alternate embodiments which implement the invention in hardware, firmware or a combination of both hardware and firmware, as well as distributing the modules and/or the data in a different fashion will be apparent to those skilled in the art. The invention may also be practiced in distributed computing environments where tasks are performed by remote processing devices that are linked through a communications network. In a distributed computing environment, program modules may be located in local and/or remote computer storage media. It should, thus, be understood that the description to follow is intended to be illustrative and not restrictive, and that many other embodiments will be apparent to those of skill in the art upon reviewing the description.

The present invention is directed toward a system, method, and a computer-readable medium for detecting and detaining suspected malware (based upon a beta signature) for a predetermined period of time, until a release signature is distributed replacing the beta signature, at which time the detained content is released from detention and rescanned with the new release signature.

The logic provided in the malware detention arrangement improves security for a user operating a computer protected with antivirus software by decreasing the window from which malware is released to the time when protection is provided (by providing an immediate beta signature for initial protection), while also mitigating false positives by providing a follow up (more accurate) release signature.

Typically, to protect a computer from malware, antivirus software is configured to scan for malware "on access" when an application program is scheduled to be executed. For example, a computer user may issue a command to start execution of an application program by "double clicking" on an icon associated with the program or by selecting the program through other means. In this instance, a request to perform input/output ("I/O") with a hardware device, such as the computer-readable medium, is typically generated by an application program. Prior to the request being satisfied, the antivirus software is notified that the I/O request occurred. In response, the antivirus software will cause one or more files associated with the application program to be scanned "on access" when data that implements the program is loaded into system memory but prior to the data being executed. Only when the antivirus software does not identify malware in the data is the application program allowed to execute.

Also, the antivirus software will typically be configured to scan all or any number of the files on the computer-readable medium "on demand" in response to a command. In this instance, certain data from files that are scheduled to be scanned for malware are loaded into system memory and scanned for malware by the antivirus software.

The malware detention arrangement may be implemented in conjunction with antivirus software that performs a scan for malware either "on access" and/or "on demand".

In addition, the antivirus software in which aspects of the malware detention arrangement may be implemented includes the anti malware engine designed to detect data that is characteristic of malware. Many different software vendors include an anti malware engine or similar software module in antivirus software. One known technique employed by some existing anti malware engines that is used to identify data characteristic of malware includes obtaining a copy of the malware "in the wild." Then the data that implements the malware is processed with a hash function that converts the data or a characteristic subset of the data into a signature that uniquely identifies the malware. The anti malware engine may employ this known technique of scanning a file for a malware signature. Also, increasingly, heuristic techniques are employed when identifying data characteristic of malware that may be used by the anti malware engine. However, it should be well understood that the examples described herein should be construed as exemplary and not limiting, as the anti malware engine may employ any one of a number of existing, or yet to be developed, malware detection techniques.

Various aspects of a malware detention system that is used to detain suspected malware, based upon a beta signature of such malware, for a predetermined period of time, have been described. It will be understood, however, that all of the described components of the detention system need not be used, nor must the components, when used, be present concurrently. Functions/components described in the context of System 300 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-implemented method for detecting and managing potential malware, the method comprising:
   receiving a preliminary signature for detection of potential malware;
   scanning content items for the potential malware using the preliminary signature;
   identifying, from among the content items that have been scanned, a particular content item having a characteristic that matches the preliminary signature;
   detaining the particular content item in a detention location at a start time;
   receiving an updated signature for detection of the potential malware before expiration of the time period;
   upon receipt of the updated signature, releasing the particular content item from detention, and automatically rescanning the particular content item for the potential malware using the updated signature;
   managing the particular content item in accordance with a policy whose outcome depends upon a result of the rescanning, and
   quarantining the particular content item within the detention location if the time period expires during which an updated signature is not received, wherein the quarantined content item is encoded to prevent re-scanning, and
      wherein the particular content item includes both suspect data and non-suspect data, and further comprising delivering the particular content item without the suspect data in parallel with the step of detaining the particular content item in a detention location.

2. The computer-implemented method of claim 1 wherein managing the particular content item includes purging the item, allowing for user access to the item, or quarantining the particular content item.

3. The computer-implemented method of claim 1 wherein the preliminary signature is a broad detection object.

4. The computer-implemented method of claim 1 wherein the preliminary signature is a beta signature.

5. The computer-implemented method of claim 1 wherein the preliminary signature is heuristic-based.

6. The computer-implemented method of claim 1 further comprising receiving the content items over a communication network and automatically scanning the content items upon receipt thereof.

7. The computer-implemented method of claim 1 further comprising receiving the content items over a communication network and scanning the content items upon user request.

8. The computer-implemented method of claim 1 wherein scanning the content items is performed on access of an application program.

9. The computer-implemented method of claim 1, wherein a message indicating that the particular content item has been sanitized is delivered together with the particular content item without the suspect data.

10. A malware detection system, comprising: a detection engine scanning content items for potential malware based on malware signatures, configured to:
- identify, from among the content items that have been scanned, a particular content item having a characteristic that matches the preliminary signature;
- detain the particular content item in a detention location at a start time;
- receive an updated signature for detection of the potential malware before expiration of the time period; upon receipt of the updated signature, release the particular content item from detention, and automatically rescan the particular content item for the potential malware using the updated signature;
- quarantine the particular content item within the detention location if the time period expires during which an updated signature is not received, wherein the quarantined content item is encoded to prevent re-scanning;
- at least one database storing broad detection objects, preliminary signatures and updated signatures;
- a detention storage unit storing scanned content items having a characteristic that matches one of the broad detection objects, preliminary signatures or updated signatures;
- an interface unit receiving over a communication network the broad detection objects, the preliminary signatures, the updated signatures and content items; and
- a management unit for admitting selected content items to and releasing selected content items from the detention storage unit, wherein the particular content item includes both suspect data and non-suspect data, and said management unit is configured to deliver a copy of the particular content item without the suspect data in parallel with detaining the particular content item in the detention storage unit, and wherein said management unit is further configured to release the particular content item from the detention storage unit upon receipt of an updated signature and automatically rescan the particular content item for the potential malware using the updated signature.

11. The system of claim 10 wherein said management unit is configured to perform periodic re-scanning of the selected content items in the detention storage unit.

12. The system of claim 10 wherein said management unit includes a rollback mechanism to restore data in the case of a malfunction.

13. A computer-implemented method for detecting and managing potential malware, the method comprising:
- scanning content items for potential malware using a stored preliminary signature;
- identifying, from among the content items that have been scanned, a particular content item having a characteristic that matches the preliminary signature;
- detaining the particular content item in a detention location for a predetermined period of time beginning at a start time;
- receiving an updated signature for detection of the potential malware before expiration of the predetermined period of time;
- upon receipt of the updated signature, releasing the particular content item from detention and automatically rescanning the particular content item for the potential malware using the updated signature;
- managing the particular content item in accordance with a policy whose outcome depends upon a result of the rescanning; and
- quarantining the particular content item within the detention location if the predetermined period of time expires during which an updated signature is not received, wherein the quarantined content item is encoded to prevent re-scanning, and wherein the particular content item includes both suspect data and non-suspect data, and further comprising delivering the particular content item without the suspect data in parallel with the step of detaining the particular content item in a detention location.

* * * * *